US011963169B2

(12) United States Patent
Tang

(10) Patent No.: US 11,963,169 B2
(45) Date of Patent: Apr. 16, 2024

(54) CONTROL METHOD, NODE, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/628,112

(22) PCT Filed: Aug. 11, 2017

(86) PCT No.: PCT/CN2017/097010
§ 371 (c)(1),
(2) Date: Jan. 2, 2020

(87) PCT Pub. No.: WO2019/028807
PCT Pub. Date: Feb. 14, 2019

(65) Prior Publication Data
US 2021/0153230 A1 May 20, 2021

(51) Int. Cl.
*H04W 72/20* (2023.01)
*H04W 72/1263* (2023.01)
*H04W 76/15* (2018.01)

(52) U.S. Cl.
CPC ....... *H04W 72/20* (2023.01); *H04W 72/1263* (2013.01); *H04W 76/15* (2018.02)

(58) Field of Classification Search
None
See application file for complete search history.

(56) References Cited

U.S. PATENT DOCUMENTS

| 10,028,328 B2* | 7/2018 | Kwon ................. H04W 76/15 |
| 2008/0101266 A1 | 5/2008 | Dahlstedt et al. |
| 2015/0264562 A1* | 9/2015 | Wu ..................... H04W 12/037 380/270 |
| 2015/0365872 A1* | 12/2015 | Dudda ................. H04W 36/30 455/436 |

(Continued)

FOREIGN PATENT DOCUMENTS

| CN | 104936274 A | 9/2015 |
| CN | 105637967 A | 6/2016 |

(Continued)

OTHER PUBLICATIONS

Canadian First Office Action for Canadian Application No. 3,068,640 dated Mar. 1, 2021.

(Continued)

*Primary Examiner* — Ajit Patel
*Assistant Examiner* — Liem H. Nguyen
(74) *Attorney, Agent, or Firm* — Young Basile Hanlon & MacFarlane, P.C.

(57) ABSTRACT

Disclosed are a control method, a node and a computer storage medium. The method may include: sending instruction information to a second node when a data bearer for a User Equipment (UE) is established, wherein the instruction information is used for turning on or off the control on a data replication function of the UE by the second node.

6 Claims, 4 Drawing Sheets

DL DC Duplication

UL DC Duplication

(56) References Cited

U.S. PATENT DOCUMENTS

| | | | | |
|---|---|---|---|---|
| 2016/0105928 | A1* | 4/2016 | Xu | H04W 72/048 |
| | | | | 370/329 |
| 2016/0255672 | A1 | 9/2016 | Uchino et al. | |
| 2016/0338139 | A1* | 11/2016 | Kwon | H04W 76/38 |
| 2017/0055191 | A1* | 2/2017 | Shinada | H04W 36/18 |
| 2017/0188248 | A1* | 6/2017 | Müller | H04L 43/0864 |
| 2018/0270718 | A1* | 9/2018 | Wang | H04W 36/0069 |
| 2018/0367288 | A1* | 12/2018 | Vrzic | H04W 36/22 |
| 2018/0376457 | A1* | 12/2018 | Tseng | H04L 1/16 |
| 2019/0159274 | A1* | 5/2019 | Hong | H04W 76/27 |
| 2019/0327607 | A1* | 10/2019 | Xiao | H04L 5/0053 |
| 2019/0327641 | A1* | 10/2019 | Mok | H04W 36/08 |
| 2020/0022106 | A1* | 1/2020 | Kim | H04L 1/1812 |
| 2020/0119864 | A1* | 4/2020 | Xu | H04L 1/08 |
| 2020/0162211 | A1* | 5/2020 | Wang | H04W 72/0433 |
| 2020/0163140 | A1* | 5/2020 | Mochizuki | H04W 72/042 |
| 2020/0187282 | A1* | 6/2020 | Yu | H04L 5/0055 |
| 2020/0205050 | A1* | 6/2020 | Shah | H04W 36/0005 |
| 2020/0236033 | A1* | 7/2020 | Wu | H04W 76/15 |
| 2021/0112610 | A1* | 4/2021 | Xiao | H04L 1/1614 |
| 2021/0144583 | A1* | 5/2021 | Xiao | H04W 76/27 |
| 2021/0176691 | A1* | 6/2021 | Dudda | H04W 36/305 |

FOREIGN PATENT DOCUMENTS

| | | |
|---|---|---|
| CN | 105992279 A | 10/2016 |
| CN | 106688298 A | 5/2017 |
| CN | 106797669 A | 5/2017 |
| CN | 111294867 A | 6/2020 |
| EP | 3065483 A1 | 9/2016 |
| EP | 3627885 A1 | 3/2020 |
| JP | 2020526092 A | 8/2020 |
| RU | 2627300 C1 | 8/2017 |
| WO | 2014179982 A1 | 11/2014 |
| WO | 2016048084 A1 | 3/2016 |
| WO | 2016200305 A1 | 12/2016 |
| WO | 2018233683 A1 | 12/2018 |
| WO | 201900185 A1 | 1/2019 |

OTHER PUBLICATIONS

European Examination Report for European Application No. 17921365.7 dated Dec. 16, 2020.
India First Office Action with English Translation for India Application No. 201917053777 dated Feb. 17, 2021.
Russia Decision to Grant with English Translation for Russia Application No. 2020100894/07 dated Dec. 9, 2020.
3GPP TS 38.300; Aug. 2017; OrganizationDuplication; pp. 1-58.
First Russian Office Action with English Translation for Application No. 2020100894 dated Sep. 11, 2020.
3GPP TSG-RAN WG2 #97; Athens, Greece, Feb. 13-17, 2017; Tdoc R2-1702032; Revision of R2-1700833.
3GPP TSG RAN WG2 NR Ad Hoc; Qingdao, China, Jun. 27-29, 2017; R2-1706716.
Extended European Search Report for EP 17921365.7 dated Apr. 28, 2020.
Chinese Notice of Reasons for Refusal with English Translation for CN Application 2020502114 dated Aug. 3, 2021. (10 pages).
Singapore Invitation to Respond to Written Opinion for SG Application 11201913101P dated Aug. 9, 2021. (6 bages).
Chinese Second Office Action with English Translation for CN Application 202010073083.2 dated Aug. 12, 2021. (12 pages).
3GPP TSG-RAN WG2 #99 Berlin, Germany, R2-1709425, Nokia, Nokia Shanghai Bell , More consideration on uplink duplication in dual connectivity, Aug. 21-25, 2017.
Japanese Notice of Reasons for Refusal with English Translation for JP Application 2020502114 dated Aug. 3, 2021. (10 pages).
Singapore Invitation to Respond to Written Opinion for SG Application 11201913101P dated Aug. 9, 2021. (6 pages).
Chile First Office Action with English Translation for CL Application 202000167 dated Mar. 17, 2021.
China First Office Action with English Translation for CN Application 202010073083.2 dated May 8, 2021.
Chile Office Action with English Translation for CL Application 2020000167 dated Dec. 13, 2021. (21 pages).
Korean Office Action with English Translation for KR Application 1020207001649 dated Nov. 24, 2021. (8 pages).
Korean Written Decision on Registration with English Translation for KR Application 1020207001649 dated May 26, 2022. (4 pages).
CATT, Packet duplication configuration and control, 3GPP TSG-RAN WG2 Meeting #NR AH2, R2-1706361, Jun. 27-29, 2017. (4 pages).
Fujitsu, Stage 2 topics on duplication, 3GPP TSG-RAN WG2 NR Ad Hoc#2, R2-1706560, Jun. 27-29, 2017. (2 pages).
Vivo, Initial state of UL duplication and Scell state, 3GPP TSG RAN WG2 NR ad Hoc, R2-1706962, Jun. 27-29, 2017. (2 pages).
Samsung, Further Discussion on Packet Duplication, 3GPP TSG-RAN WG2 Ad-hoc NR#2, R2-1707366, Jun. 27-29, 2017. (3 pages).
Israel Office Action for IL Application 271722 dated Aug. 21, 2022. (5 pages).
Indonesia First Office Action with English Translation for ID Application P00202000530 dated Oct. 6, 2022. (7 pages).
Chinese First Office Action with English Translation for CN Application 201780092270.1 dated Jul. 24, 2023. (14 pages).
Indian Hearing Notice for IN Application 201917053777 mailed Aug. 28, 2023. (2 pages).

* cited by examiner

```
┌──────────────────────────────────────────────────────────────┐  31
│ A slave node may send information (i.e., the first type of   │
│ indication information) to a master node to instruct the     │
│ master node to send an MAC CE to perform a control over      │
│ data duplication                                             │
└──────────────────────────────────────────────────────────────┘
                              │
                              ▼
┌──────────────────────────────────────────────────────────────┐  32
│ The slave node sends control information (here, it may be the│
│ first type of activation or deactivation control information)│
│ to a UE, to inform the UE to perform an activation or        │
│ deactivation control over the data duplication function      │
│ according to the MAC CE sent by the master node              │
└──────────────────────────────────────────────────────────────┘
```

FIG. 3

```
┌──────────────────────────────────────────────────────────────┐  41
│ A slave node may send information (i.e., the second type of  │
│ indication information) to a master node to instruct that the│
│ master node does not need to send an MAC CE to perform a     │
│ control over data duplication                                │
└──────────────────────────────────────────────────────────────┘
                              │
                              ▼
┌──────────────────────────────────────────────────────────────┐  42
│ The slave node sends control information (here, it may be the│
│ second type of activation or deactivation control information│
│ to a UE, to inform the UE to perform an activation or        │
│ deactivation control over the data duplication function      │
│ according to the MAC CE sent by the slave node               │
└──────────────────────────────────────────────────────────────┘
```

FIG. 4

CONTROL METHOD, NODE, AND COMPUTER STORAGE MEDIUM

CROSS-REFERENCE TO RELATED APPLICATION(S)

This application is a 371 application of International Application No. PCT/CN2017/097010, filed on Aug. 11, 2017, the entire disclosure of which is hereby incorporated by reference.

TECHNICAL FIELD

The present disclosure relates to a technical field of Internet of Vehicles, in particular to a control method, a node and a computer storage medium.

BACKGROUND

A widespread use of small cell and a corresponding requirement of non-ideal backhaul give birth to a dual-connection technology, namely, a carrier aggregation mode in which a terminal is connected to a micro base station and a small cell base station simultaneously. Under the dual-connection technology, a protocol architecture of split bearer is adopted in a duplication data transmission mode.

At present, for a wireless bearer configured with a duplication data transmission function, the data duplication transmission function of the bearer may be dynamically activated or de-activated by an MAC Control Element (CE). For a case of dual-connection, a master cell group (MCG) and a secondary cell group (SCG) may respectively send the MAC CEs to activate or deactivate the duplication data function of any split bearer in a terminal. However, in a dual-connection scenario, since both a master node (such as a node in MCG) and a slave node (such as a node in SCG) may send the MAC CE, coordination between network nodes is needed.

SUMMARY

Implementations of the present disclosure provide a control method, a node and a computer storage medium.

A control method provided by an implementation of the present disclosure is applied to a first node, including:

sending instruction information to a second node when a data bearer is established for a user equipment (UE); wherein the instruction information is used for turning on or off a control by the second node over a data duplication function of the UE.

A control method provided by an implementation of the invention is applied to a second node, including:

receiving instruction information sent by a first node when a data bearer is established for a user equipment (UE); wherein the instruction information is used for turning on or off a control by the second node over a data duplication function of the UE.

A first node provided by an implementation of the present disclosure, includes:

a first communication unit, which sends instruction information to a second node when a data bearer is established for a user equipment (UE); wherein the instruction information is used for turning on or off a control by the second node over a data duplication function of the UE.

A second node provided by an implementation of the present disclosure, includes:

a receiving unit, which receives instruction information sent by a first node when a data bearer is established for a user equipment (UE); wherein the instruction information is used for turning on or off a control by the second node over a data duplication function of the UE.

A computer storage medium provided by an implementation of the present disclosure stores computer executable instructions, and when the computer executable instructions are executed, the control method of an implementation of the present disclosure is implemented.

BRIEF DESCRIPTION OF DRAWINGS

FIG. 3 is a schematic flow chart 3 of a control method according to an implementation of the present disclosure.

FIG. 4 is a schematic flow chart 4 of a control method according to an implementation of the present disclosure.

DETAILED DESCRIPTION

To understand features and technical contents of implementations of the present disclosure in more detail, realizations of the implementations of the present disclosure will be described in detail below in combination with the accompanying drawings, the accompanying drawings are used for reference only and are not intended to limit the implementations of the present disclosure.

Implementation One

Figure 1:
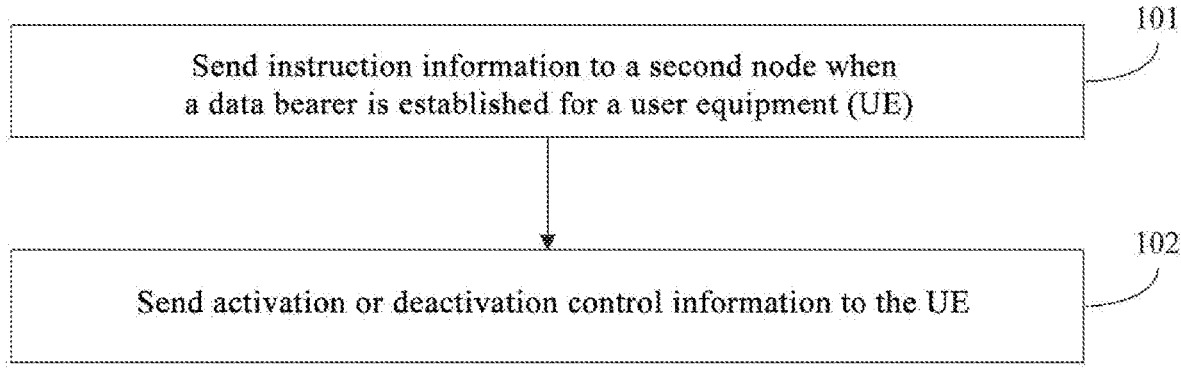
FIG. 1 is a schematic flow chart 1 of a control method according to an implementation of the present disclosure.

The present disclosure provides a control method, applied to a first node, as shown in FIG. 1, including following acts 101 and 102.

In act 101, when a data bearer is established for a user equipment (UE), instruction information is sent to a second node; wherein the instruction information is used for turning on or off a control by the second node over a data duplication function of the UE.

In act 102, activation or deactivation control information is sent to the UE; wherein the activation or deactivation control information is used for instructing the UE to perform an activation or deactivation control over the data duplication function according to control information of the second node or the first node.

It should be noted that in this implementation, the second node may be a control node (such as a master node) in a master cell group, and the first node may be a control node (such as a slave node) in a secondary cell group; or, conversely, the first node may be a master node and the second node may be a slave node, which is not exhaustive here.

The aforementioned control information can be carried and sent by an MAC control element (CE), and will not be repeated here.

Specifically, when the data bearer is established for the user equipment UE, sending the instruction information to the second node, includes: sending a first type of instruction information to the second node, wherein the first type of instruction information is used for instructing the second node to perform an activation or deactivation control over the data duplication function for the UE; or, sending a second type of instruction information to the second node, wherein the second type of instruction information is used for indicating the second node not to perform an activation or deactivation control over the data duplication function for the UE.

That is, the first node controls whether the second node turns on the data duplication function for the UE. Correspondingly, sending the activation or deactivation control information to the UE, includes: when the instruction information sent to the second node for the UE is the first type of instruction information, sending a first type of activation or deactivation control information to the UE, wherein the first type of activation or deactivation control information is used for instructing the UE to perform activation or deactivation control over the data duplication function based on the control information (MAC control element (CE)) of the second node; when the instruction information sent to the second node for the UE is the second type of instruction information, sending a second type of the activation or deactivation control information to the UE, wherein the second type of the activation or deactivation control information is used for instructing the UE to perform the activation or deactivation control over the data duplication function based on the control information (MAC control element (CE)) of the first node.

The UE is notified of whether to perform the control over the data duplication function based on the MAC CE of the second node or the MAC CE of the first node, through the first type of instruction information or the second type of instruction information.

Further, it should be pointed out that, in the present implementation, before the network configures the user's data bearer indicated in act 101, various processes may be included for implementing. For example, the processing flow provided in this implementation may be implemented when an SCG split bearer is established. Of course, it may also be implemented in other processes, which is not exhaustive in this implementation.

In this implementation, following various scenarios may be provided. It should be understood that the following scenarios are illustrated with the first node being the slave node and the second node being the master node. However, in actual processing, the second node may be the slave node and the first node may be the master node, and it is not exhaustive for all scenarios in this implementation.

Scenario One

Figure 2:
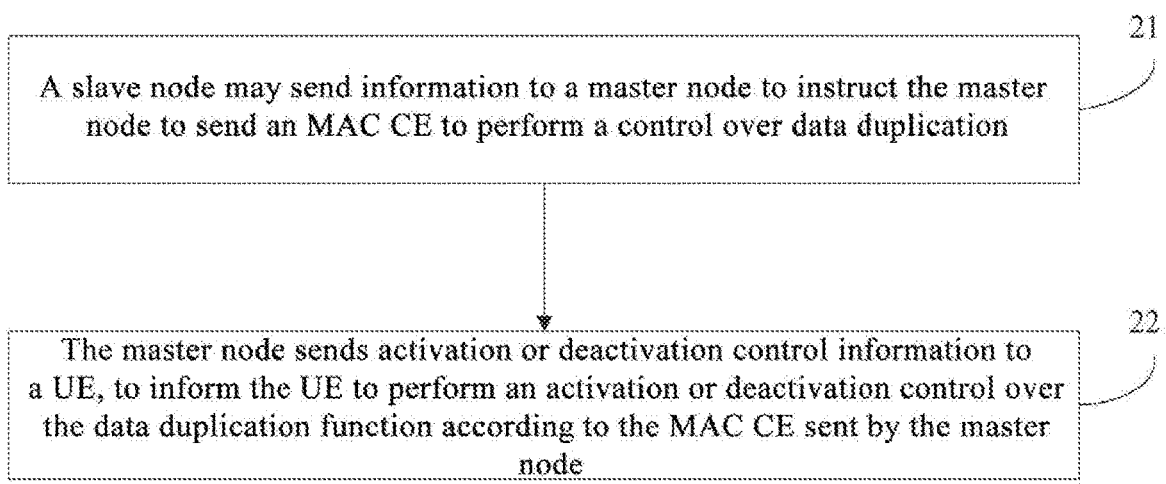
FIG. 2 is a schematic flow chart 2 of a control method according to an implementation of the present disclosure.

Referring to FIG. 2,

In act 21, before the network configures the user's data bearer, for example, when an SCG split bearer is established, a slave node (i.e., the aforementioned first node) may send information (i.e., the aforementioned first type of indication information) to a master node (i.e., the aforementioned second node), to instruct the master node to send an MAC CE to perform a control over data duplication.

In act 22, the master node sends activation or deactivation control information (here, it may be the first type of the activation or deactivation control information) to a UE, to inform the UE to perform an activation or deactivation control over the data duplication function according to the MAC CE sent by the master node.

Further, after act 22 is accomplished, the master node may also control the UE to perform the activation or deactivation control over the data duplication function. The specific processing manner is not described here in detail.

Scenario Two

Referring to FIG. 3,

In act 31, before the network configures the user's data bearer, for example, when an SCG split bearer is established, a slave node may send information (i.e., the first type of indication information) to a master node, to instruct the master node to send an MAC CE to perform a control over data duplication.

In act 32, the slave node sends control information (here, it may be the first type of activation or deactivation control information) to a UE, to inform the UE to perform an activation or deactivation control over the data duplication function according to the MAC CE sent by the master node.

Further, after act 32 is accomplished, the master node may also control the UE to perform the activation or deactivation control over the data duplication function. The specific processing manner is not described here in detail.

Scenario Three

Referring to FIG. 4,

In act 41, before the network configures the user's data bearer, for example, when an SCG split bearer is established, a slave node may send the information (i.e., the second type of indication information) to a master node, to instruct that the master node does not need to send an MAC CE to perform a control over data duplication.

In act 42, the slave node sends control information (here, it may be the second type of activation or deactivation control information) to a UE, to inform the UE to perform an activation or deactivation control over the data duplication function according to the MAC CE sent by the slave node.

Further, after act 42 is accomplished, the slave node may also control the UE to perform the activation or deactivation control over the data duplication function. The specific processing manner is not described here in detail.

Scenario Four

Figure 5:
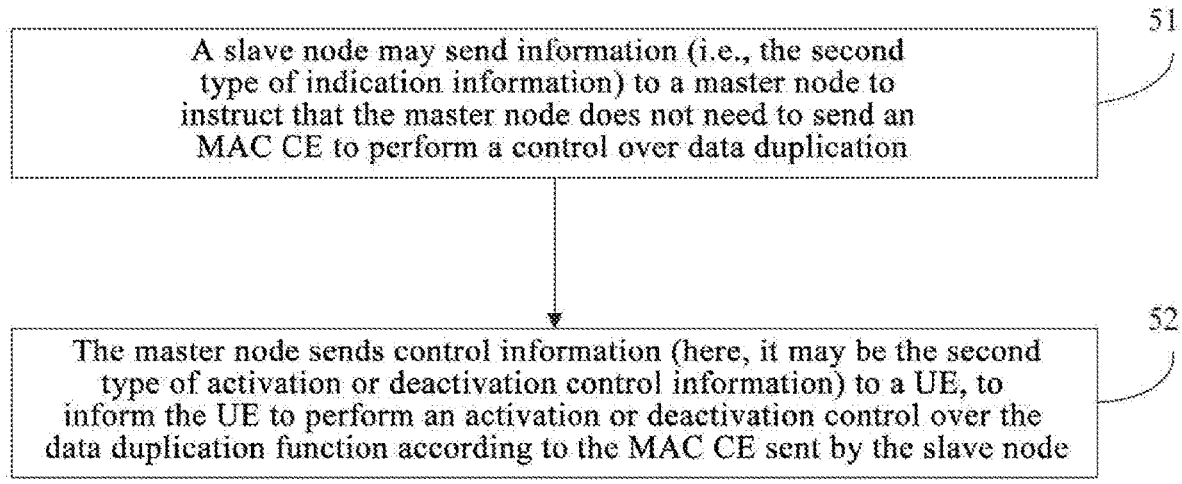
FIG. 5 is a schematic flow chart 5 of a control method according to an implementation of the present disclosure.

Referring to FIG. 5,

In act 51, before the network configures the user's data bearer, for example, when an SCG split bearer is established, a slave node may send information (i.e., the second type of indication information) to a master node, to instruct that the master node does not need to send an MAC CE to perform a control over data duplication.

In act 52, the master node sends control information (here, it may be the second type of activation or deactivation control information) to a UE, to inform the UE to perform an activation or deactivation control over the data duplication function according to the MAC CE sent by the slave node.

Further, after act 52 is accomplished, the slave node may also control the UE to perform the activation or deactivation control over the data duplication function. The specific processing manner is not described here in detail.

Figure 6:
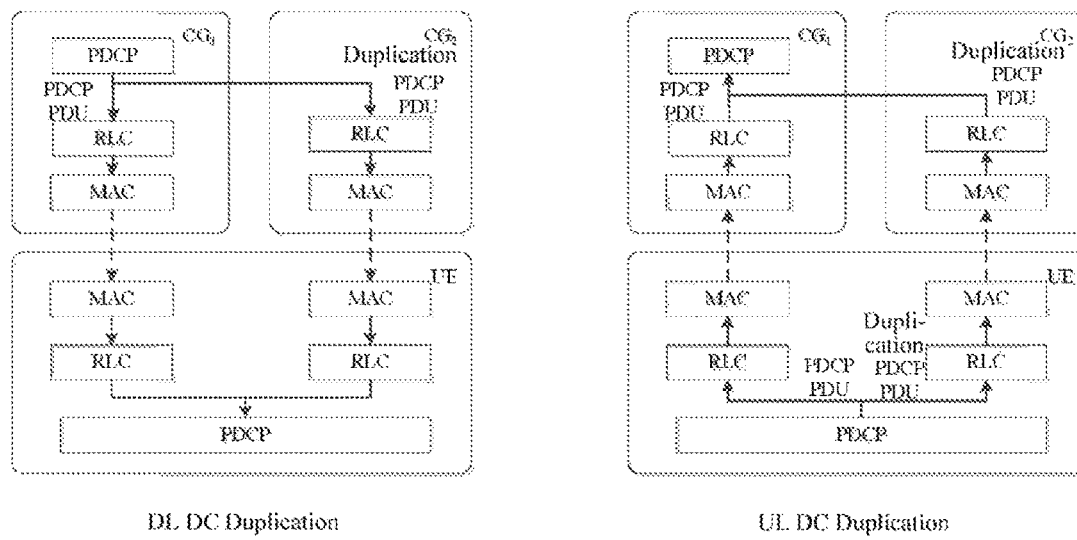
FIG. 6 is a structural diagram of architecture according to an implementation of the present disclosure.

Finally, for the description of the overall architecture of performing the data duplication function described in this implementation, it may refer to FIG. 6. For uplink and downlink, with regard to a duplication data transmission mode, the Packet Data Convergence Protocol (PDCP) layer is located in a Cell Group (CG), where the cell group may include a Master Cell Group (MCG) and a Secondary Cell Group (SCG). By the PDCP, the PDCP Protocol Data Unit (PDU) is duplicated into two same copies. The two PDCP PDUs arrive at the corresponding MAC and RLC layers of a terminal (downlink) or a base station (uplink) through RLCs, MACs and air interfaces of different CGs, and finally converge at a PDCP layer. The PDCP layer detects that the two PDCP PDUs are the same copies, discards one of the copies and submits the other copy to a higher layer.

It can be seen that by adopting the above solution, the first node turns on or off the control by the second node over the data duplication function of the UE, and then instructs the UE to control the data duplication function based on the control by the first node or the second node. Therefore, the problem that the UE side receives the control information of the second node and the first node to control the data duplication function in a dual-connection scenario is avoided, and coordination may be carried out between the second node and the first node in advance, so that the coordination and processing efficiency among various nodes in the network structure are improved.

Implementation Two

The present disclosure provides a control method, applied to a second node, including: when a data bearer is established for a user equipment (UE), receiving instruction information sent by a first node; wherein the instruction information is used for turning on or off a control by the second node over the data duplication function of the UE.

The definitions of the second node and the first node are the same as those of the previous implementations, and will not be repeated here.

After receiving the instruction information, the method further includes the following processing manners.

Manner 1: when the instruction information sent by the first node is a first type of instruction information, wherein the first type of instruction information is used for instructing the second node to perform the activation or deactivation control over the data duplication function for the UE, the first type of activation or deactivation control information is sent to the UE. The first type of activation or deactivation control information is used for instructing the UE to perform the activation or deactivation control over the data duplication function based on control information of the second node (specifically, it may be an MAC control element (CE)).

Manner 2: when the instruction information sent by the first node is a second type of instruction information, wherein the second type of instruction information is used for instructing the second node not to perform the activation or deactivation control over the data duplication function for the UE, the second type of activation or deactivation control information is sent to the UE. The second type of activation or deactivation control information is used for instructing the UE to perform activation or deactivation control over the data duplication function based on control information of the first node (specifically, it may be an MAC control element (CE)).

After sending the first type of activation or deactivation control information to the UE, the method further includes: sending the control information of activation or deactivation of the data duplication function to the UE through the MAC CE. That is, after determining that the second node controls the data duplication function of the UE, specific control information for activation or deactivation of the data duplication function may be sent to the UE.

Further, it should be pointed out that, in the present implementation, before the network configures the user's data bearer, various processing processes may be included for implementing. For example, the processing flow provided in the implementation may be implemented when an SCG split bearer is established. Of course, it may also be implemented in other processes, which is not exhaustive in this implementation.

In the present implementation, following various scenarios may be provided. It should be understood that the following scenarios are illustrated with the first node being the slave node and the second node being the master node. However, in actual processing, the second node may be the slave node and the first node may be the master node, it is not exhaustive for all scenarios in this implementation.

Scenario One

Referring to FIG. 2,

In act 21, before the network configures the user's data bearer, for example, when an SCG split bearer is established, the slave node may send the information (i.e., the first type of indication information) to the master node, to instruct the master node to send the MAC CE to perform the control over the data duplication.

In act 22, the master node sends the control information (here, it may be the first type of the activation or deactivation control information) to the user equipment, to inform the UE to perform the activation or deactivation control over the data duplication function according to the MAC CE sent by the master node.

Further, after act 22 is accomplished, the master node may also control the UE to perform the activation or deactivation control over the data duplication function. The specific processing manner is not described here in detail.

Scenario Two

Referring to FIG. 3,

In act 31, before the network configures the user's data bearer, for example, when an SCG split bearer is established, the slave node may send the information (i.e., the first type of indication information) to the master node, to instruct the master node to send the MAC CE to perform the control over the data duplication.

In act 32, the slave node sends the control information (here, it may be the first type of activation or deactivation control information) to the user equipment, to inform the UE to perform the activation or deactivation control over the data duplication function according to the MAC CE sent by the master node.

Further, after act 32 is accomplished, the master node may also control the UE to perform the activation or deactivation control over the data duplication function. The specific processing manner is not described here in detail.

Scenario Three

Referring to FIG. 4,

In act 41, before the network configures the user's data bearer, for example, when an SCG split bearer is established, the slave node may send the information (i.e., the second type of indication information) to the master node, to instruct that the master node does not need to send the MAC CE to perform the control over the data duplication.

In act 42, the slave node sends the control information (here, it may be the second type of activation or deactivation control information) to the user equipment, to inform the UE to perform the activation or deactivation control over the data duplication function according to the MAC CE sent by the slave node.

Further, after act 42 is accomplished, the slave node may also control the UE to perform the activation or deactivation control over the data duplication function. The specific processing manner is not described here in detail.

Scenario Four

Referring to FIG. 5,

In act 51, before the network configures the user's data bearer, for example, when an SCG split bearer is established, the slave node may send the information (i.e., the second type of indication information) to the master node, to instruct that the master node does not need to send the MAC CE to perform the control over the data duplication.

In act 52, the master node sends the control information (here, it may be the second type of activation or deactivation control information) to the user equipment, to inform the UE to perform the activation or deactivation control over the data duplication function according to the MAC CE sent by the slave node.

Further, after act 52 is accomplished, the slave node may also control the UE to perform the activation or deactivation control over the data duplication function. The specific processing manner is not described here in detail.

Finally, for the description of the overall architecture of performing the data duplication function described in this implementation, it may refer to FIG. 6. For uplink and downlink, with regard to a duplication data transmission mode, the Packet Data Convergence Protocol (PDCP) layer is located in a Cell Group (CG), where the cell group may include a Master Cell Group (MCG) and a Secondary Cell Group (SCG). By the PDCP, the PDCP Protocol Data Unit (PDU) is duplicated into two same copies. The two PDCP PDUs arrive at the corresponding MAC and RLC layers of a terminal (downlink) or a base station (uplink) through RLCs, MACs and air interfaces of different CGs, and finally converge at a PDCP layer. The PDCP layer detects that the two PDCP PDUs are the same copies, discards one of the copies and submits the other copy to a higher layer.

It can be seen that by adopting the above solution, the first node turns on or off the control by the second node over the data duplication function of the UE, and then instructs the UE to control the data duplication function based on the control by the first node or the second node. Therefore, the problem that the UE side receives the MAC CE of the second node and the first node to control the data duplication function in a dual-connection scenario is avoided, and coordination may be performed between the second node and the first node in advance, so that the coordination and processing efficiency among various nodes in the network structure are improved.

Implementation 3

Figure 7:
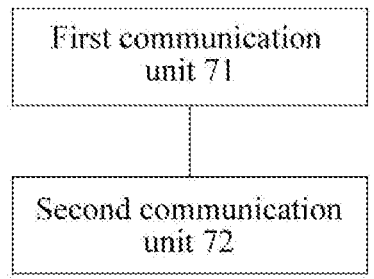
FIG. 7 is a schematic structural diagram of a first node according to an implementation of the present disclosure.

The present disclosure provides a first node, as shown in FIG. 7, including a first communication unit 71 and a second communication unit 72.

The first communication unit 71 is configured to send instruction information to a second node when a data bearer is established for a user equipment (UE). The instruction information is used for turning on or off a control by the second node over a data duplication function of the UE.

The second communication unit 72 is configured to send activation or deactivation control information to the UE. The activation or deactivation control information includes information for instructing the UE to perform an activation or deactivation control over the data duplication function according to the control information sent by the second node or the first node (specifically, it may be an MAC control element (CE)).

It should be noted that in this implementation, the second node may be a control node in a master cell group and the first node may be a control node in a secondary cell group.

Specifically, the first communication unit 71 sends a first type of instruction information to the second node, the first type of instruction information is used for instructing the second node to perform the activation or deactivation control over the data duplication function for the UE. Or, the first communication unit 71 sends a second type of instruction information to the second node, the second type of instruction information is used for instructing the second node not to perform the activation or deactivation control over the data duplication function for the UE.

That is, the second communication unit 72 sends the first type of activation or deactivation control information to the UE when the instruction information sent to the second node for the UE is the first type of instruction information. The first type of activation or deactivation control information is used for instructing the UE to perform the activation or deactivation control over the data duplication function based on the control information of the second node (specifically, it may be an MAC control element (CE)). The second communication unit 72 sends the second type of activation or deactivation control information to the UE when the instruction information sent to the second node is the second type of instruction information. The second type of activation or deactivation control information is used for instructing the UE to perform the activation or deactivation control over the data duplication function based on the control information of the first node (specifically, it may be an MAC control element (CE)).

The UE is notified of whether to perform the control over the data duplication function based on the MAC CE of the second node or the MAC CE of the first node, through the first type of instruction information or the second type of instruction information.

Further, it should be pointed out that before the network configures the user's data bearer, various processing processes may be included for implementing. For example, the processing flow provided in this implementation may be implemented when an SCG split bearer is established. Of course, it may also be implemented in other processes, which is not exhaustive in this implementation.

In this implementation, following various scenarios may be provided. It should be understood that the following scenarios are illustrated with the first node being the slave node and the second node being the master node. However, in actual processing, the second node may be the slave node and the first node may be the master node, it is not exhaustive for all scenarios in this implementation.

Scenario One

Referring to FIG. 2,

The slave node may send the information (i.e. the first type of indication information) to the master node, to instruct the master node to send the MAC CE to perform the control over the data duplication. The master node sends the control information (here, it may be the first type of activation or deactivation control information) to the user equipment, to inform the UE to perform the activation or deactivation control over the data duplication function according to the MAC CE sent by the master node.

Furthermore, the master node may also control the UE to perform the activation or deactivation control over the data duplication function. The specific processing manner is not described here in detail.

Scenario Two

Before the network configures the user's data bearer, for example, when an SCG split bearer is established, the first communication unit of the slave node may send the information (i.e., the first type of indication information) to the master node, to instruct the master node to send the MAC CE to perform the control over the data duplication.

The second communication unit of the slave node sends the control information (here, it may be the first type of activation or deactivation control information) to the user equipment, to inform the UE to perform the activation or deactivation control over the data duplication function according to the MAC CE sent by the master node.

Furthermore, the master node may also control the UE to perform the activation or deactivation control over the data duplication function. The specific processing manner is not described here in detail.

Scenario Three

Before the network configures the user's data bearer, for example, when an SCG split bearer is established, the first communication unit of the slave node may send the information (i.e., the second type of indication information) to the master node to instruct that the master node does not need to send the MAC CE to perform the control over the data duplication.

The second communication unit of the slave node sends the control information (here, it may be the second type of activation or deactivation control information) to a UE, to inform the UE to perform the activation or deactivation control over the data duplication function according to the MAC CE sent by the slave node.

Furthermore, the second communication unit of the slave node may also control the UE to perform the activation or deactivation control over the data duplication function. The specific processing method is not described here.

Scenario Four

Before the network configures the user's data bearer, for example, when an SCG split bearer is established, the first communication unit of the slave node may send the information (i.e., the second type of indication information) to the master node to instruct that the master node does not need to send the MAC CE perform the control over the data duplication.

The master node sends the control information (here, it may be the second type of activation or deactivation control information) to a UE, to inform the UE to perform the activation or deactivation control over the data duplication function according to the MAC CE sent by the slave node.

Further, the second communication unit of the first node may also control the UE to perform the activation or deactivation control over the data duplication function. The specific processing mode is not described here.

Finally, for the description of the overall architecture of performing the data duplication function described in this implementation, it may refer to FIG. 6. For uplink and downlink, with regard to a duplication data transmission mode, the Packet Data Convergence Protocol (PDCP) layer is located in a Cell Group (CG), where the cell group may include a Master Cell Group (MCG) and a Secondary Cell Group (SCG). By the PDCP, the PDCP Protocol Data Unit (PDU) is duplicated into two same copies. The two PDCP PDUs arrive at the corresponding MAC and RLC layers of a terminal (downlink) or a base station (uplink) through RLCs, MACs and air interfaces of different CGs, and finally converge at a PDCP layer. The PDCP layer detects that the two PDCP PDUs are the same copies, discards one of the copies and submits the other copy to a higher layer.

It can be seen that by adopting the above solution, the first node turns on or off the control by the second node over the data duplication function of the UE, and then instructs the UE to control the data duplication function based on the control by the first node or the second node. Therefore, the problem that the UE side receives the MAC CEs of the second node and the first node to control the data duplication function in a dual-connection scenario is avoided, and coordination may be performed between the second node and the first node in advance, so that the coordination and processing efficiency among various nodes in the network structure are improved.

Implementation Four

Figure 8:
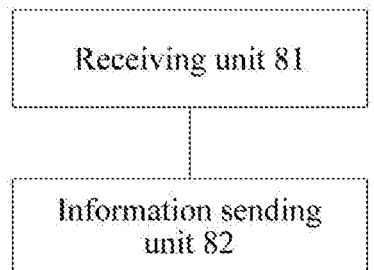
FIG. 8 is a schematic structural diagram of a second node according to an implementation of the present disclosure.

The present disclosure provides a second node, as shown in FIG. 8, including: a receiving unit 81, configured to receive instruction information sent from a first node when a data bearer is established for a user equipment (UE), the instruction information is used for turning on or off a control by the second node over a data duplication function of the UE.

The definitions of the second node and the first node are the same as those of the previous implementations, and will not be repeated here.

After receiving the instruction information, the method further includes the following processing manners.

Manner 1

An information sending unit 82, when the instruction information sent by the first node is a first type of instruction information, wherein the first type of instruction information is used for instructing a second node to perform an activation or deactivation control of the data duplication function for the UE, sends a first type of activation or deactivation control information to the UE. The first type of activation or deactivation control information is used for instructing the UE to perform the activation or deactivation control over the data duplication function based on the MAC Control Element (CE) of the second node.

Manner 2

An information sending unit 82, when the instruction information sent by the first node is a second type of instruction information, wherein the second type of instruction information is used for instructing the second node not to perform an activation or deactivation control over the data duplication function for the UE, sends a second type of the activation or deactivation control information to the UE. The second type of the activation or deactivation control information is used for instructing the UE to perform the activation or deactivation control over the data duplication function based on the MAC Control Element (CE) of the first node.

The information sending unit sends the control information of activation or deactivation of the data duplication function to the UE through the MAC CE. That is, after determining that the second node controls the data duplication function of the UE, specific control information for the activation or deactivation of the data duplication function may be sent to the UE.

Further, it should be pointed out that, in the present implementation, before the network configures the user's data bearer, various processing processes may be included for implementing. For example, the processing flow provided in the implementation may be implemented when an SCG split bearer is established. Of course, it may also be implemented in other processes, which is not exhaustive in this implementation.

It can be seen that by adopting the above solution, the first node turns on or off the control by the second node over the data duplication function of the UE, and then instructs the UE to control the data duplication function based on the control by the first node or the second node. Therefore, the problem that the UE side receives the MAC CEs of the second node and the first node to control the data duplication function in a dual-connection scenario is avoided, and coordination may be performed between the second node and the first node in advance, so that the coordination and processing efficiency among various nodes in the network structure are improved.

Figure 9:
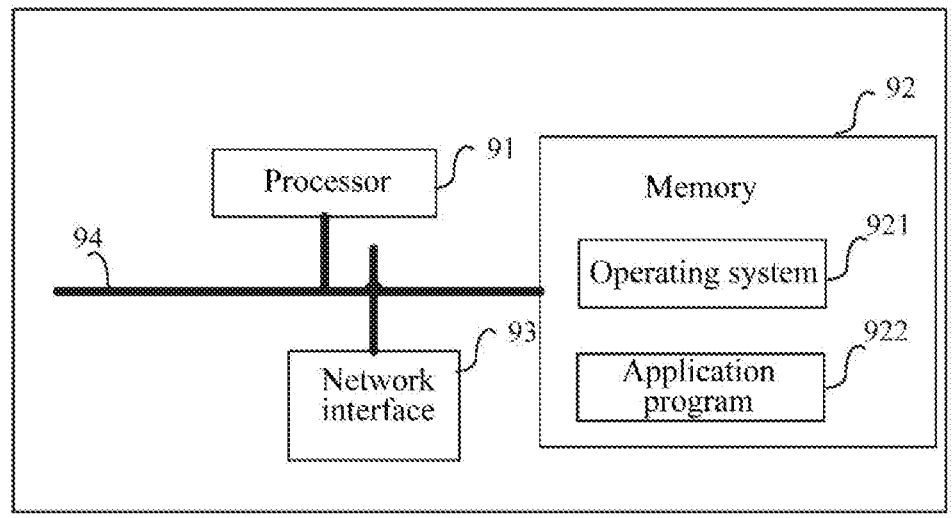
FIG. 9 is a structural diagram of hardware according to an implementation of the present disclosure.

An implementation of the present disclosure further provides architecture of hardware of a first node or a second node. As shown in FIG. 9, the architecture of hardware of the first node or the second node includes at least one processor 91, a memory 92, and at least one network interface 93. The various components are coupled together by a bus system 94. It may be understood that the bus system 94 is used for implementing connection and communication between these components. In addition to a data bus, the bus system 84 includes a power bus, a control bus, and a status signal bus. However, for clarity, all kinds of buses are uniformly referred to as a bus system 94 in the FIG. 10.

It should be understood that the memory 92 in an implementation of the present disclosure may be a volatile memory or a non-volatile memory, or it may include both volatile and non-volatile memory.

In some implementations, the memory 92 stores following elements, executable modules or data structures, or subsets thereof, or extension sets thereof: an operating system 921 and an application program 922.

The processor 91 is configured to send the instruction information to a second node when a data bearer is established for a user equipment UE, wherein the instruction information is used for turning on or off a control by the second node over a data duplication function of the UE; send activation or deactivation control information to the UE, wherein the control information includes information for instructing the UE to perform an activation or deactivation control over the data duplication function according to the MAC control element (CE) of the first node or the second node.

Or, when a data bearer is established for user equipment UE, the processor 91 is configured to receive instruction information sent by a first node; the instruction information is used for turning on or off a control by the second node over the data duplication function of the UE.

An above-mentioned device in an implementation of the present disclosure may also be stored in a computer readable storage medium when it is implemented in a form of a software function module and sold or used as an independent product. Based on this understanding, the technical solutions in implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes various media capable of storing program codes such as a U disk, a mobile hard disk, a Read Only memory (ROM), a magnetic disk or an optical disk. Thus, implementations of the present disclosure are not limited to any specific combination of hardware and software.

Correspondingly, an implementation of the present disclosure also provides a computer storage medium in which a computer program is stored, and the computer program is configured to implement the data scheduling method in an implementation of the present disclosure.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method of control, comprising:

sending, by a first base station, instruction information to a second base station when a secondary cell group (SCG) split bearer is established for a user equipment (UE), wherein the instruction information is used to carry out coordination between the second base station and the first base station in advance, and to instruct the second base station to turn on or off a control by the second base station over a data duplication function of the UE, wherein, when the instruction information sent to the second base station for the UE is a first type of instruction information, sending, by the first base station, a first type of activation or deactivation control information to the UE, wherein the first type of activation or deactivation control information is used for instructing the UE to perform activation or deactivation control over the data duplication function based on the MAC Control Element (CE) of the second base station, wherein, when the instruction information sent to the second base station for the UE is a second type of instruction information, sending, by the first base station or the second base station, a second type of the activation or deactivation control information to the UE, wherein the second type of the activation or deactivation control information is used for instructing the UE to perform the activation or deactivation control over the data duplication function based on the MAC CE of the first base station, wherein the first base station is in an SCG, and wherein the second base station is in a master cell group (MCG).

2. A method of control, comprising:

receiving, by a second base station, instruction information sent by a first base station when a secondary cell group (SCG) split bearer is established for a user equipment (UE), wherein the instruction information is used to carry out coordination between the second base station and the first base station in advance, and to instruct the second base station to turn on or off a control by the second base station over a data duplication function of the UE, wherein, when the instruction information sent to the second base station for the UE is a first type of instruction information, a first type of activation or deactivation control information is sent to the UE by the first base station, wherein the first type of activation or deactivation control information is used for instructing the UE to perform activation or deactivation control over the data duplication function based on the MAC Control Element (CE) of the second base station, wherein, when the instruction information sent to the second base station for the UE is a second type of instruction information, a second type of the activation or deactivation control information is sent to the UE by the first base station or the second base station, wherein the second type of the activation or deactivation control information is used for instructing the UE to perform the activation or deactivation control over the data duplication function based on the MAC CE of the first base station, wherein the first base station is in an SCG, and wherein the second base station is in a master cell group (MCG).

3. A first base station, comprising:
a processor and a memory, wherein
the processor is configured to send instruction information to a second base station when a secondary cell group (SCG) split bearer is established for a user equipment (UE), the instruction information is used to carry out coordination between the second base station and the first base station in advance, to instruct the second base station to turn on or off a control by the second base station over a data duplication function of the UE,
the processor is further configured to, when the instruction information sent to the second base station for the UE is a first type of instruction information, send a first type of activation or deactivation control information to the UE, the first type of activation or deactivation control information is used for instructing the UE to perform activation or deactivation control over the data duplication function based on the MAC Control Element (CE) of the second base station,
the processor is further configured to, when the instruction information sent to the second base station for the UE is a second type of instruction information, send a second type of the activation or deactivation control information to the UE, the second type of the activation or deactivation control information is used for instructing the UE to perform the activation or deactivation control over the data duplication function based on the MAC CE of the first base station,
the first base station is in an SCG, and
the second base station is in a master cell group (MCG).

4. A first base station, comprising:
a processor and a memory, wherein
the processor is configured to send instruction information to a second base station when a secondary cell group (SCG) split bearer is established for a user equipment (UE), the instruction information is used to carry out coordination between the second base station and the first base station in advance, to instruct the second base station to turn on or off a control by the second base station over a data duplication function of the UE,
the processor is further configured to, when the instruction information sent to the second base station for the UE is a first type of instruction information, send a first type of activation or deactivation control information to the UE, the first type of activation or deactivation control information is used for instructing the UE to perform activation or deactivation control over the data duplication function based on the MAC Control Element (CE) of the second base station,
the processor is further configured to, when the instruction information sent to the second base station for the UE is a second type of instruction information, send a second type of the activation or deactivation control information to the UE, the second type of the activation or deactivation control information is used for instructing the UE to perform the activation or deactivation control over the data duplication function based on the MAC CE of the first base station,
the first base station is in an SCG, and
the second base station is in a master cell group (MCG).

5. A non-transitory computer storage medium, storing computer-executable instructions, which, when executed by a processor, implement acts in the method of claim 1.

6. A non-transitory computer storage medium, storing computer-executable instructions, which, when executed by a processor, implement acts in the method of claim 2.

* * * * *